United States Patent [19]

Gordon

[11] Patent Number: 4,966,338
[45] Date of Patent: Oct. 30, 1990

[54] AIRCRAFT PYLON

[75] Inventor: Bruce J. Gordon, Cincinnati, Ohio

[73] Assignee: General Electric Company, Cincinnati, Ohio

[21] Appl. No.: 81,772

[22] Filed: Aug. 5, 1987

[51] Int. Cl.[5] .................. B64C 23/00; B64D 27/00
[52] U.S. Cl. ................................. 244/54; 244/130
[58] Field of Search .............. 244/54, 55, 56, 201, 244/204, 206, 212, 213, 198, 199, 130, 1 N

[56] References Cited

U.S. PATENT DOCUMENTS

| | | | |
|---|---|---|---|
| 2,142,123 | 1/1939 | Fahrney | 244/212 |
| 2,257,940 | 10/1941 | Dornier | 244/56 |
| 2,406,625 | 8/1946 | Oglesby | 244/55 |
| 2,426,635 | 9/1947 | Mercier | 244/130 |
| 2,510,959 | 6/1950 | Custer | 244/198 |
| 3,081,964 | 3/1963 | Quenzler | 244/56 |
| 3,090,584 | 5/1963 | Kuchemann | 244/199 |
| 3,121,544 | 2/1964 | Alvarez-Calderon | 244/206 |
| 3,179,354 | 4/1965 | Alvarez-Calderon | 244/56 |
| 3,181,810 | 5/1965 | Olson | 244/66 |
| 3,191,888 | 6/1965 | Sklenka | 244/55 |
| 3,415,468 | 12/1968 | Labombarde | 244/55 |
| 3,572,960 | 3/1971 | McBride | 415/115 |
| 3,599,749 | 8/1971 | Millman | 181/33 HC |
| 3,685,610 | 8/1972 | Bschorr | 181/33 L |
| 3,695,388 | 10/1972 | Paxhia et al. | 181/33 F |
| 3,726,091 | 4/1973 | Tontini | 60/264 |
| 3,826,331 | 7/1974 | Scharton et al. | 181/33 HC |
| 4,007,896 | 2/1977 | Reynolds, III | 244/130 |
| 4,199,295 | 4/1980 | Raffy et al. | 415/115 |
| 4,685,643 | 8/1987 | Henderson | 244/199 |

FOREIGN PATENT DOCUMENTS 1209723 10/1970 United Kingdom ................. 244/55

Primary Examiner—Galen Barefoot
Attorney, Agent, or Firm—Jerome C. Squillaro; John R. Rafter

[57] ABSTRACT

In an aircraft propulsion system which includes a pusher propeller driven by an engine which is mounted to a fuselage by a pylon, the invention concerns apparatus for reducing turbulence generated by the pylon. In one example, a flap or vane attached to the pylon postpones the onset of flow separation, thereby reducing turbulence.

10 Claims, 3 Drawing Sheets

AIRCRAFT PYLON

The invention relates to a structure (commonly called a pylon) which attaches an aircraft engine to an aircraft fuselage and, more particularly, to teh aerodynamic aspects and noise generation aspects of such a structure.

BACKGROUND OF THE INVENTION

FIG. 1 illustrates an aircraft fuselage 3 powered by tail mounted, counterrotating, pusher prop fans 6A and 6F. The prop fans are driven by an engine (not shown) contained within a nacelle 9. Extending between the nacelle 9 and the aircraft fuselage is a pylon 12, more clearly shown in FIG. 2. The pylon is an aerodynamic fairing which surrounds the structure which supports the engine, and other apparatus such as fuel and electrical lines, which connect to the engine.

The pylon 12 sheds a wake 15 during flight, no matter how well the pylon is designed. One reason is that, as shown in FIG. 4, the thickness 16 of boundary layer 16A progressively increases in the downstream direction 17, causing a velocity profile 17A to exist at the trailing edge 17B. (The velocity profile 17A illustrates the variation in velocity of air molecules as a function of distance from the pylon. For example, velocity vector 17C represents the air velocity at distance 17D from the pylon centerline 17E.)

The velocity profile 17A at the pylon trailing edge produces a "velocity defect," Vd, in the wake, which is the difference in velocity between the freestream velocity, $V_o$ (outside the wake), and the local velocity, $V_I$, in this example.

The velocity defect region has an accompanying "mass flow defect," and consequently, air, indicated by path 17H, tends to be entrained into the velocity defect region 17F causing turbulence.

A second reason is that the angle of attack of the fuselage 3 will change during flight, while the pylon is designed for producing a minimal wake at a single, optimal angle of attack. Consequently, the pylon produces a larger wake at angles which differ from the optimal angle.

The wake has two undesirable side effects. One, when the prop fan blades pass through the wake 15, they chop the wake, producing noise. An exaggerated example, shown in FIG. 3, will illustrate this point. When a ship's propeller 18 operates partly submerged in water 21, each blade makes a noise as it enters the water. The water can be viewed as analogous to the wake 15 in FIG. 2; noise is produced when each propeller blade passes through the wake 15.

If each prop fan has eight blades and rotates at 20 revolutions per second, then 160 chops occur per second. This situation resembles a noise source broadcasting at 160 Hz, together with overtones.

A second side effect results from the fact that the lift produced by a propeller blade is a function of the angle of attack of the blade with respect to the incoming air. When a blade enters the wake 15, the angle of attack changes as shown in FIG. 5.

The angle of attack A1 experienced by blade 6A is the vector "sum 1" of two vectors: (1) freestream vector $V_o$, resulting from the forward speed of the aircraft and (2) vector "rotation" representing the rotational velocity of the blade 6A.

When the blade 6A enters the wake, freestream vector $V_0$ becomes reduced, as illustrated by vector $V_1$ (also shown in FIG. 2A). Consequently, the vector "sum 1" changes to vector "sum 2." This latter vector "sum 2" causes a higher angle of attach A2 to occur.

As a result, the prop fan blade 6A becomes more highly loaded, and the lift load in the direction of arrow 26 of FIG. 2 (thrust direction) becomes greater, causing the blade to flex in that direction. Given that, for example, the type of engine shown in FIG. 2 can be of the 25,000 pound thrust class, and that a total of sixteen prop fan blades can be used, the total loading per blade is approximately 1,560 pounds (25,000 divided by 16). Even a small percentage increase in thrust during passage through the wake 15, such as a ten percent increase, can cause significant stresses on the blades and potential damage to the blades over a period of time. An example will illustrate this.

Assume that the blade radius 31 in FIG. 2 is five feet. Thus, the circle described by the tip 33 of each blade is approximately thirty-one feet in circumference. (Five times two times pi equals approximately thirty one.) Assume, as above, a speed for each prop fan of twenty revolutions per second. Therefore, in this example, the tip region 33 of each blade is traveling along the circumference at the rate of about 620 feet per second. (Thirty-one feet per revolution times twenty revolutions per second.)

If the wake is assumed to be one foot high, dimension 38, and if it is assumed that the wake provides a ten percent increase in lift during an excursion by a blade through it, then each blade experiences an impulse of ten percent of the thrust load, or about one hundred fifty pounds, applied during an interval of 1/620 seconds, that is, an interval of about 1.6 milliseconds. Further, at 20 revolutions per second, each blade passes through the wake once every 1/20 second, or every 50 milliseconds. Restated, a cyclic load of 150 pounds is applied for 1.6 milliseconds to each blade every 50 milliseconds. It is clear that such a cyclic loading should be avoided.

OBJECT OF THE INVENTION

It is an object of the present invention to provide a new and improved aircraft propulsion system, whereby pylon-induced noise and cyclic loads are significantly reduced.

SUMMARY OF THE INVENTION

In one form of the invention, the wake produced by a pylon supporting a pusher propeller is reduced, thereby reducing both wake chopping noise and periodic propeller blade bending occurring during excursions through the wake. One approach for reducing the wake is to add a flap to the pylon.

DETAILED DESCRIPTION OF THE INVENTION

Figure 6:
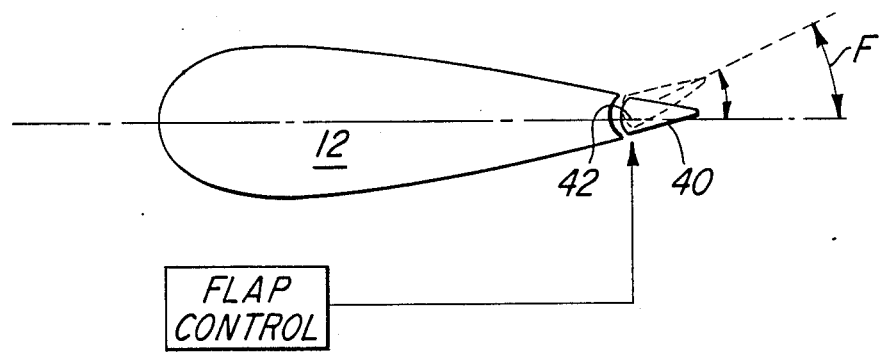
FIGS. 6–9 illustrate three forms of the invention.

Several forms of the invention are shown in FIGS. 6–9. In FIG. 6, pylon 12 bears an adjustable flap 40 which rotates about point 42. Airfoil flaps, and their means of actuation, are known in the art.

Figure 7:
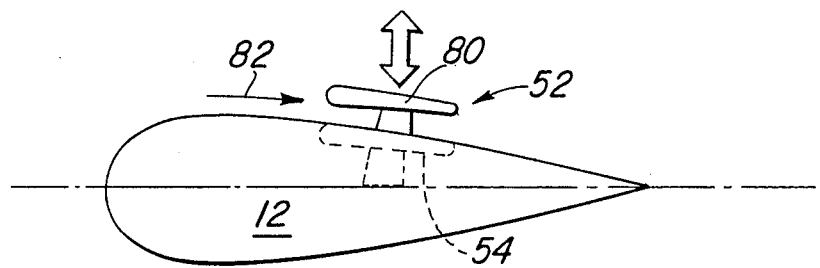

FIG. 7 illustrates a pylon 12 and, in addition, a deployable vane 52 which is housed within a conforming groove 54 when not in use. When wake control is desired, the vane 52 is brought into the solid position shown, in order to affect the flow of stream lines 82. Vane 52 can pivot about point 80.

Figure 8:
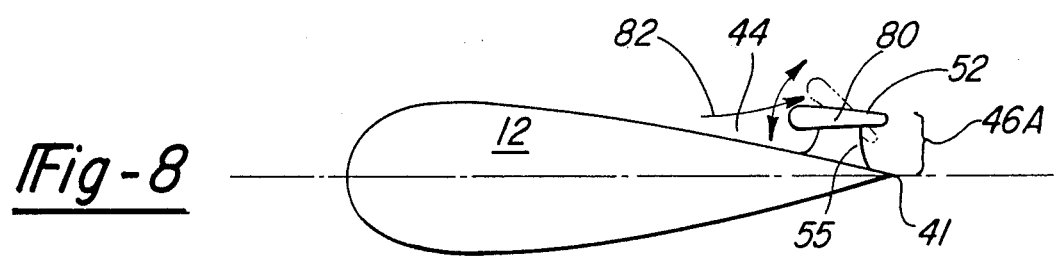

In FIG. 8, a vane 52 is supported by a mast 55. The vane 52 is rotatable about a pivot 80. The vane 52 assists in the return of stream line 82, which would otherwise separate at point 44 and form a wake, to the pylon surface to foster smooth stream line joining at the trailing edge 41.

Figure 1:
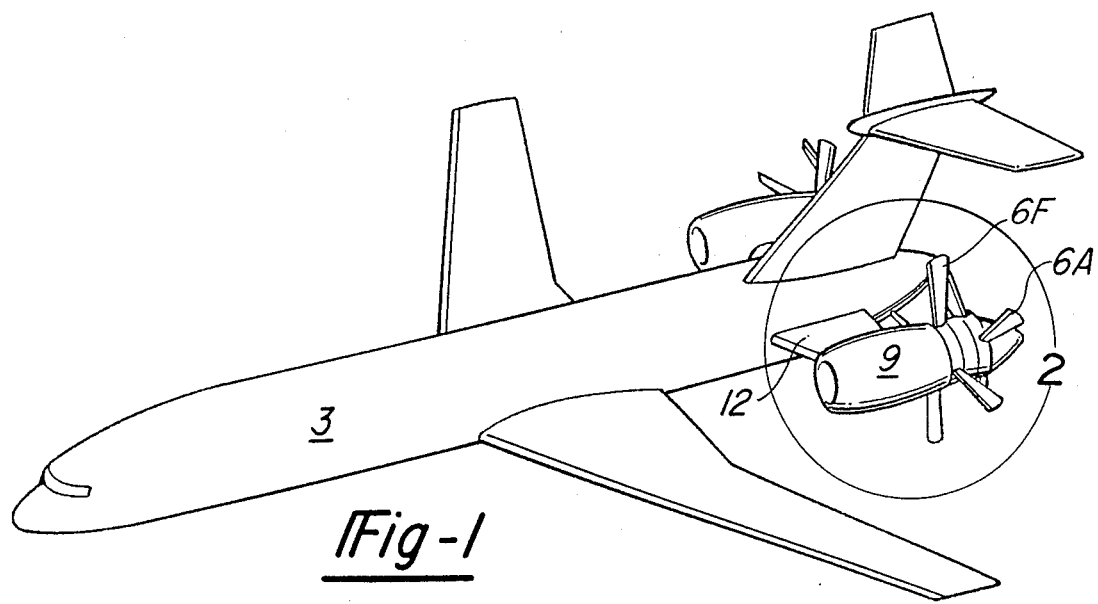
FIG. 1 illustrates an aircraft powered by tail-mounted, counter-rotating prop fans or propellers.
Figure 2:
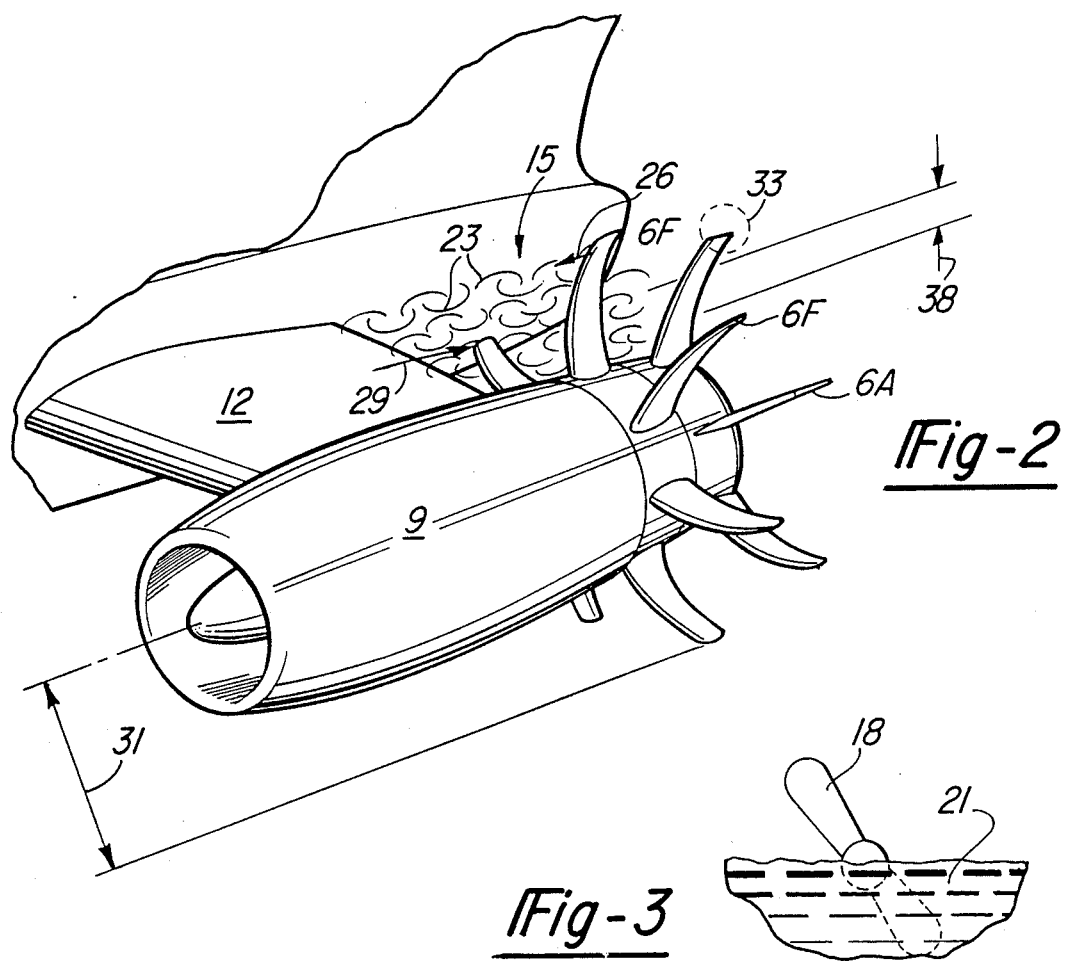
FIG. 2 illustrates in more detail circled region 2 in FIG. 1, including the wake 15 shed by the pylon 12.
Figure 3:
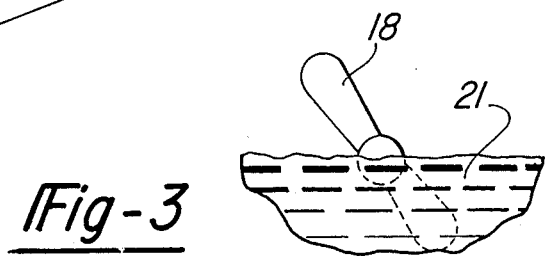
FIG. 3 illustrates a ship's propeller partly submerged in water.
Figure 9:
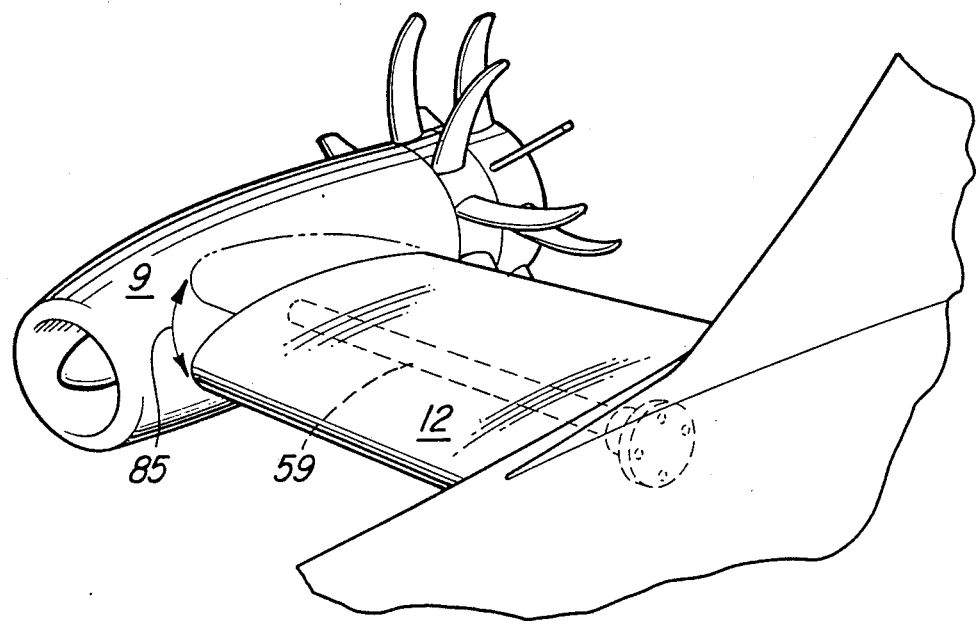

FIG. 9 illustrates (schematically) a mast 59 which supports the engine (not shown) contained within nacelle 9. Pylon 12 takes the form of a fairing which reduces drag of the mast 59 and other components leading between the nacelle 9 and the fuselage 3. The pylon 12 is rotatable about the mast, as shown by arrow 85. The rotation adjusts the angle of attack which pylon 12 sees. Thus, the angle of attack of the pylon 12 is independently adjustable when compared with that of the fuselage 3 in FIG. 1. The magnitude of the wake produced by the pylon is a function of the angle of attack.

Figure 4:
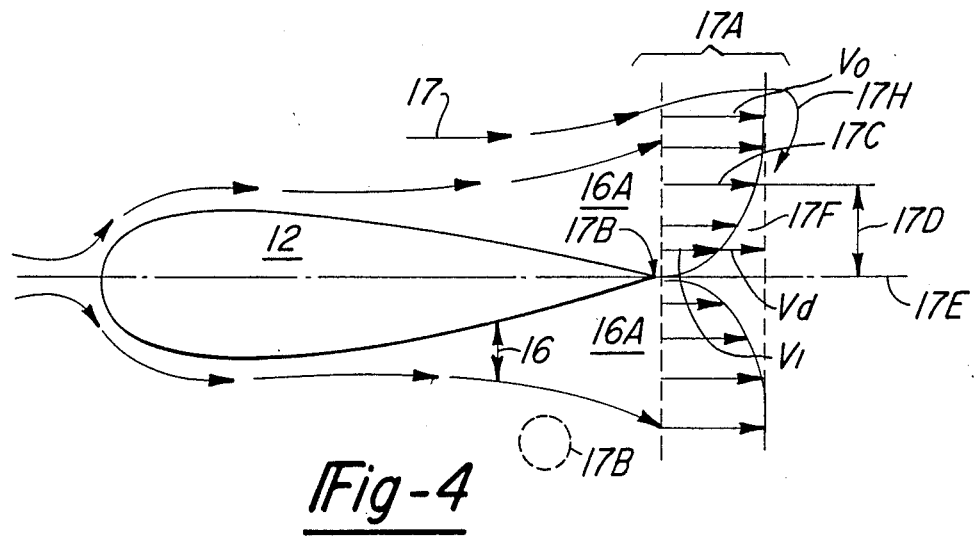
FIG. 4 illustrates the viscous boundary layer flow on the surface of the pylon 12, shown in cross section, and the resultant wake produced.
Figure 5:
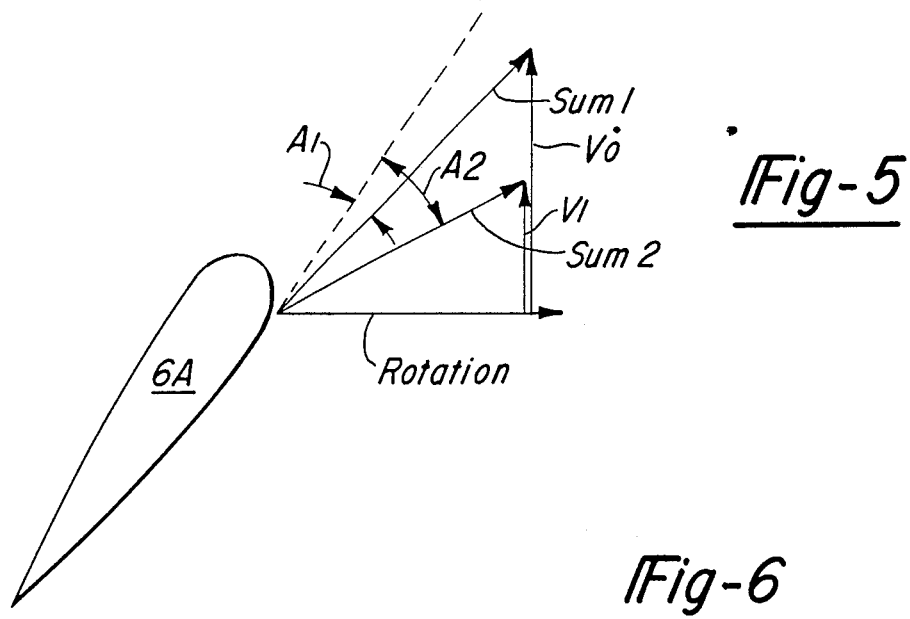
FIG. 5 illustrates the change which occurs in angle of attack as a propeller blade 6A enters the wake 15 in FIG. 2.

Several important aspects of the invention are the following:

1. Even though the wake 15 results from boundary layer formation, as discussed in connection with FIG. 4, the wake is, in some respects, also a result of the lift produced by the pylon. That is, even if the pylon 12 were perfectly symmetric in cross section, as shown in FIG. 5, nevertheless, at a given angle of attack, indicated by angle AI, pylon 12 will produce lift. The existence of lift is generally accompanied by (1) vortex formation, (2) turbulence, (3) at least a mild disturbance, or any combination of the preceding effects, located in the downstream flow field. Thus, to the extend that one can control lift, one can control wake formation. Therefore, changing position of flaps in FIG. 6–8 can be viewed as controlling the wake through controlling the lift provided by the pylon 12.

2. The angle of attack of the pylon 12 will, in general, change under differing flight conditions. For example, if the pylon 12 experiences a given angle during flight, this angle will increase when the angle of attack of the aircraft increases during an approach for landing. Therefore, a wake of greater intensity may be produced during landing maneuvers. Consequently, the intensity of wake reduction measures should be increased at this time. For example, flap angle F in FIG. 6 should be reduced under these conditions.

In one embodiment, these wake reduction measures are directly controlled by the pilot using servomechanisms known in the art, and illustrated by the block labeled "Flap Control" in FIG. 6. However, automatic control, based on direct or indirect wake measurement is envisioned. Further, control of wake reduction measures based on a schedule is also envisioned.

Scheduling refers to a two-stage approach. First, one operates the aircraft under varying flight conditions and measures wake size. Then, later, when similar flight conditions occur which caused large wake sizes, the wake reduction measures are undertaken. That is, wake reduction is undertaken in response to the presently measured flight conditions (which condition may include wake size) which have previously shown to cause wakes.

An invention has been described wherein the wake ordinarily produced by a pylon which supports a pusher propeller is reduced in order to both (1) reduce the wake chopping noise produced by the propeller, and (2) to reduce the periodic blade flexing inflicted upon the propeller blades by the wake. Further, the degree of wake reduction is modified as needed as flight characteristics change. For example, it is possible that a greater wake reduction will be necessary during a high angle of attack landing approach.

Numerous substitutions and modifications can be undertaken without departing from the true spirit and scope of the invention as defined by the following claims.

What is claimed is:

1. In an aircraft propulsion system which includes (A) an engine which drives a pusher propeller, (B) a support which extends between the engine and the aircraft and which supports the weight of the engine, and (C) a pylon located forward of the propeller for reducing drag of the support, the improvement comprising:
   (a) a movable vane, which does not control yaw, pitch, roll, or lift of the aircraft, effective for reducing wakes produced by the pylon.

2. For a pylon which reduces drag of a support for a pusher propeller, the improvement comprising:
   (a) a mast extending from the pylon; and
   (b) a movable vane, which does not control yaw, pitch, roll, or lift of the aircraft, and supported by the mast for modifying wakes produced by the pylon.

3. For a nylon which reduces drag of a support for a pusher propeller, the improvement comprising:
   (a) a vane, which does not control yaw, pitch, roll, or lift of the aircraft, which can be housed in the pylon, and which can be deployed into the airstream passing the pylon for reducing the wake of the pylon.

4. In an aircraft propulsion system which comprises at least one pusher propeller located downstream of a pylon, which reduces drag of a support structure which supports the entire weight of an engine driving the propeller and which produces turbulence which the propeller ingests, the improvement comprising:
   (a) a flap, which does not control yaw, pitch, roll, or lift of the aircraft, for modulating the turbulence produced by the pylon and
   (b) control means for controlling the modulation of (a) in response to different flight conditions, including different angles of attack of the aircraft.

5. An aircraft propulsion system, comprising:
   (a) a fuselage;
   (b) a nacelle housing an engine and located near the tail of the fuselage;
   (c) a pusher propeller located aft of the nacelle;
   (d) an engine mount supporting the engine and extending between the fuselage and the engine; and
   (e) a fairing around the engine mount, having a selectable angle of attack with respect to the freestream which is independent of angle of attack of the fuselage.

6. An aircraft propulsion system, comprising:

(a) a fixed-axis pusher propeller located aft of a pylon which reduces drag of a support structure which supports an engine which drives the propeller; and
(b) a movable vane, which does not control yaw, pitch, roll, or lift of the aircraft, located near the pylon for modifying wakes produced by the pylon.

7. An aircraft propulsion system, comprising:
(a) a pylon (i) extending between an engine nacelle and an aircraft fuselage, (ii) located aft of the aircraft main wing, (iii) surrounding a support structure which transmits the weight of the engine nacelle to the fuselage; and (iv) which reduces drag of the support structure;
(b) a pusher propeller located aft of the pylon; and
(c) a movable vane, which does not control yaw, pitch, roll, or lift of the aircraft, located near the pylon for modifying wakes produced by the pylon.

8. An aircraft propulsion system, comprising:
(a) at least one engine nacelle mounted to the fuselage, aft of the aircraft main wing;
(b) a pusher propeller located aft of the nacelle; and
(c) a flapped pylon extending between the fuselage and the nacelle.

9. An aircraft propulsion system, comprising:
(a) an aircraft fuselage;
(b) an engine nacelle mounted in fixed alignment to the fuselage;
(c) a pylon extending between the fuselage and the nacelle, which surrounds a support structure which transmits the weight of the nacelle to the fuselage, and which reduces drag of the support structure;
(d) a pusher propeller located aft of the nacelle; and
(e) a vane, which does not control yaw, pitch, roll, or lift of the aircraft, for modifying wakes produced by the pylon.

10. In an aircraft propulsion system which includes an engine which drives a pusher propeller, a support extending between the engine and the aircraft, and a pylon located forward of the propeller for reducing drag of the support, the improvement comprising:
(a) a movable vane, which does not control yaw, pitch, roll, or lift of the aircraft, effective for reducing pylon wakes received by the propeller.

* * * * *